(12) United States Patent
D'Alessio et al.

(10) Patent No.: US 11,401,990 B2
(45) Date of Patent: Aug. 2, 2022

(54) SPRING DEVICE FOR DISC BRAKE, PAD SPRING AND DISC BRAKE ASSEMBLY

(71) Applicant: FRENI BREMBO S.P.A., Bergamo (IT)

(72) Inventors: Davide D'Alessio, Curno (IT); Matteo Costa, Curno (IT); Daniel Longhi, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 452 days.

(21) Appl. No.: 16/473,122

(22) PCT Filed: Dec. 14, 2017

(86) PCT No.: PCT/IB2017/057924
§ 371 (c)(1),
(2) Date: Jun. 24, 2019

(87) PCT Pub. No.: WO2018/116088
PCT Pub. Date: Jun. 28, 2018

(65) Prior Publication Data
US 2021/0356006 A1    Nov. 18, 2021

(30) Foreign Application Priority Data
Dec. 23, 2016   (IT) .................. 102016000130800

(51) Int. Cl.
*F16D 65/40*     (2006.01)
*F16D 65/097*    (2006.01)
(Continued)

(52) U.S. Cl.
CPC ....... *F16D 65/0977* (2013.01); *F16D 55/226* (2013.01); *F16D 65/0056* (2013.01); *F16D 65/0068* (2013.01); *F16D 2055/0016* (2013.01)

(58) Field of Classification Search
CPC ............... F16D 65/0977; F16D 55/226; F16D 65/0056; F16D 65/0068; F16D 2055/0016
See application file for complete search history.

(56) References Cited

U.S. PATENT DOCUMENTS

| 4,940,120 A | 7/1990 | Schmidt et al. |
| 5,947,234 A | 9/1999 | Shimazaki |

(Continued)

FOREIGN PATENT DOCUMENTS

| DE | 19714278 A1 | 11/1997 |
| EP | 2368057 A1 | 9/2011 |

(Continued)

OTHER PUBLICATIONS

European Patent Office, International Search Report and Written Opinion issued in PCT/IB2017/057924, dated Mar. 19, 2018, 18 pages, European Patent Office, Rijswijk, Netherlands.

*Primary Examiner* — Nicholas J Lane
(74) *Attorney, Agent, or Firm* — Marshall & Melhorn, LLC

(57) ABSTRACT

A spring device for a disc brake, a pad and spring assembly for a disc brake, a brake caliper, and a disc brake is described. The spring device may have a spring body having prevalently longitudinal development, with at least one coupling portion, to couple in a snapping manner the spring device to a portion of an associable brake caliper in a removable manner. The spring pad assembly may have at least one brake pad having at least one ramp surface, inclined with respect to the radial direction and to the tangential direction, which forms an abutment reference for the at least one thrust surface of the spring device. The at least one ramp surface of the support plate puts in traction the spring device.

12 Claims, 7 Drawing Sheets

(51) Int. Cl.
 *F16D 55/226* (2006.01)
 *F16D 65/00* (2006.01)
 F16D 55/00 (2006.01)

(56) References Cited

U.S. PATENT DOCUMENTS

| | | | |
|---|---|---|---|
| 9,400,025 B2 | 7/2016 | Maestrini et al. | |
| 9,464,678 B2 | 10/2016 | Cerutti et al. | |
| 10,316,912 B2 | 6/2019 | Crippa et al. | |
| 10,914,351 B2 * | 2/2021 | Furukawa | F16D 55/228 |
| 2008/0060888 A1 * | 3/2008 | Arakawa | F16D 65/0977 |
| | | | 188/73.45 |
| 2014/0251736 A1 * | 9/2014 | Nanri | F16D 65/0068 |
| | | | 188/72.2 |
| 2014/0251737 A1 * | 9/2014 | Nanri | B60T 1/065 |
| | | | 188/72.5 |
| 2015/0027822 A1 * | 1/2015 | Cerutti | F16D 55/228 |
| | | | 188/73.47 |
| 2017/0037916 A1 * | 2/2017 | Crippa | F16D 65/0977 |
| 2017/0102042 A1 * | 4/2017 | Crippa | F16D 65/0972 |

FOREIGN PATENT DOCUMENTS

| | | |
|---|---|---|
| EP | 0715090 A1 | 6/2019 |
| WO | 2008/075386 A1 | 6/2008 |
| WO | 2015/155708 A1 | 10/2015 |

* cited by examiner

SPRING DEVICE FOR DISC BRAKE, PAD SPRING AND DISC BRAKE ASSEMBLY

FIELD OF THE INVENTION

The present invention relates to a spring device for disc brake, a pad and spring assembly for a disc brake, a brake caliper, and a disc brake.

BACKGROUND ART

The brake caliper of a disc brake is generally arranged straddling the outer peripheral margin of a brake disc, adapted to rotate about a rotational axis defining an axial direction (X-X). In a disc brake, a radial direction (R-R), which is substantially orthogonal to said axial direction (X-X), and a tangential or circumferential direction (T-T), orthogonal to both said axial direction (X-X) and said radial direction (R-R), is further defined. Brake pads generally comprise a pad onto which a friction material is fixed, adapted to press against a facing braking surface of the braking band of the brake disc. The aforesaid axial (X-X), radial (R-R) and tangential (T-T) or circumferential (T-T) directions are understood as defined on a brake pad, even when it is considered alone.

As known, opposite brake pads are pressed in disc brake calipers, by virtue of the action of at least one piston, against opposite braking surfaces of a braking band of a braking band by the associable brake disc. During the step of releasing of the braking, the at least one piston ceases to apply the thrust action, but the pad which is in contact with the braking band tends to remain in place, whereby generating a residual braking torque and an annoying noise, which can be perceived also by the vehicle users. Such a residual braking torque causes an undesired wear of the pads and of the brake disc, which implies more frequent maintenance for their replacement, and minimum fuel consumption for feeding the drive unit with the energy, even if minimum, needed to overcome this residual torque.

For this reason, it is known to provide the calipers with springs, which apply an axial thrust action on the pads, whereby separating them from the brake disc. Obviously, during the step of braking, such a separation thrust action is overcome by the thrust applied by the pistons, but during the step of releasing said springs apply a thrust in axial direction sufficient to distance the pads from the braking surfaces of the brake disc, whereby avoiding the contact between the pads and the brake disc when no braking action is required. For example, springs of this type are shown in documents EP-2368057 to the Applicant, DE-19714278 and EP-0715090.

In some known solutions, such springs also apply a thrust action on the pads in circumferential or tangential direction, in order to settle the pad, in particular the pad plate, against a rest provided in the caliper body. This rest is guaranteed on the working side of the pad in forward travel of the vehicle, so as to position the pad to relieve the braking action applied on the brake disc on the body on the caliper. For example, Italian patent application No. 102015000087274, in the name of the Applicant, shows a leaf spring solution which elastically biases a pair of opposite pads both axially away from the disc, and tangentially or circumferentially, by virtue of opposite laminated spring tines.

A known type of pad is the so-called pad of the type hanging on pins, which includes eyelets made in the pad plate and adapted to receive pins specifically provided in the body of the caliper and intended to sustain the pad, in which the braking action is transmitted from the material to the plate surrounding said eyelets to the caliper body by virtue of such pins. The thrust action in circumferential or tangential action applied by the springs on the pads contrasts the acceleration possessed by the pad pressed on the braking band of the disc with respect to the caliper body to avoid the onset of a settling and abutment knock between the edges of the eyelets of the pad and the caliper body pins, at the beginning of the vehicle braking action.

A different type of pad is the so-called pad of the type resting on the caliper body, which is accommodated in a specific pocket obtained in the caliper body, in which the braking action is transmitted by a flank of the pad plate to the caliper body when said plate flank abuts against a facing abutment surface of the caliper body pocket, at the beginning of the vehicle braking action. The pins associated with this type of pads acts as sliding axial guides, to guide the approaching movement of the pads to disc and the separation of the pads from the disc. Also for this type of pad, the thrust action in circumferential or tangential direction applied by the springs avoids the onset of a setting and abutment knock between the flank of the pad plate and the caliper body pocket walls.

Some known solutions of anti-noise springs have been suggested with the purpose of providing a brake caliper adapted to provide the quietest possible braking action. For example, document WO-2015-155708, to the Applicant, shows a leaf spring coupled to the caliper bridge and adapted to circumferentially bias opposite pads of the type hanging on pins provided in the caliper body. In order to contrast the knocking between pad and pad hanging pins, such a spring solution is bent and compressed longitudinally so that its arms engage in undercut manner against protrusions or horns which extend in overhanging manner from the radially outer side of the plate of the pad.

This solution, although advantageous from some points of view, does not fully solve the problem, and indeed imposes strict manufacturing tolerances of the undercut niches of the pad plate, in order to allow the spring arms to apply the required elastic biasing action on the pad. Furthermore, such a solution, given the poor accessibility of the undercut niches formed by the horns of the plate, results in a complicated assembly of the pad on the spring and of the spring and pad assembly to the caliper body.

Additionally, a spring of this type is coupled to the radially outer surface of the caliper bridge and is elastically loaded by means of longitudinal compression to be inserted in the undercut niches defined in the protruding horns of the pad. When returning to its extended, non-deformed state, such a spring applies an elastic action directed radially externally on the radially inner face of the protruding horns of the pad. A thus made spring necessarily has an undesirable dimension in radial direction, which contrasts with the need to make discs of increasingly greater diameter which impose a radial space reduction in the wheel rim for the brake caliper housing.

The need is thus strongly felt to provide a spring device and a pad and spring assembly solution, which is efficient in contrasting the knock noise despite having small radial dimension as compared to known solutions.

The need is thus felt to provide a spring device and a pad and spring assembly solution, which despite having small radial dimension as compared to the known solutions, is efficient in contrasting the knock noise and at the same time is efficient in separating the brake pads from the disc braking surfaces preventing the residual braking torque.

The need is further felt to provide a spring device and a pad and spring assembly solution which is compact without because of this resulting in a poor anti-knock action.

The need is further felt to provide a solution of spring device and of pad and spring assembly capable of providing an effective anti-knock action also for the brake pads of the type resting on the caliper body.

The need is further felt to provide a brake caliper and a disc brake capable of providing quiet braking.

Solution

It is an object of the present invention to solve the drawbacks of the prior art and to provide a solution to the needs described hereto with reference to the prior art.

These and other objects are achieved by a spring device according to claim 1, by a pad and spring assembly according to claim 4, by a brake caliper according to claim 7, and by a disc brake according to claim 10.

Some advantageous embodiments are the subject of the dependent claims.

According to an aspect of the invention, a spring device for a disc brake comprises a spring body having prevalent longitudinal development, said spring body comprising at least one coupling portion, to connect by snapping said spring device to a portion of an associable brake caliper in removable manner, at least a first thrust portion, or disc-inlet-side thrust portion, and at least a second thrust portion, or disc-outlet side thrust portion, longitudinally opposite to said disc-inlet-side thrust portion with respect to said coupling portion of the trust body; said at least a first thrust portion and said at least a second thrust portion being adapted to bias at least one brake pad, in axial direction away from the disc, in inner radial direction, and in tangential direction in opposition to the rotation direction of the disc to contrast the tangential acceleration of the brake pad during the braking action; wherein each of said at least one disc-inlet-side thrust portion and said at least one disc-outlet-side thrust portion comprises at least one cradle comprising a convex surface, which in working position substantially faces the inner radial direction and is adapted to face the at least one brake pad; and wherein said convex surface of the at least one cradle comprises a thrust surface, adapted to form an axial, tangential and radial abutment reference for at least one portion of a support plate of the at least one brake pad, so that said at least one pad, by pressing against said convex surface of the cradle of said at least one disc-inlet-side thrust portion and of said at least one disc-outlet-site thrust portion, puts in traction the spring body of said spring device between said disc-inlet-side thrust portion and said disc-outlet-side thrust portion, providing an assembly preload to the spring device.

According to an aspect of the invention, a pad and spring assembly for a disc brake comprises at least one brake pad and at least one spring device, wherein said at least one brake pad comprises at least one friction material and at least one support plate, said at least one support plate comprising a friction surface with which said friction material is associated, an opposite plate back, adapted to form an abutment reference of a brake caliper which can be associated with the brake pad, and a plate edge which delimits said friction surface and said opposite plate back; said plate edge comprising a radially inner edge, facing the radially inner direction, and a radially outer edge, facing in radially outer direction, wherein said radially outer edge comprises at least one protrusion edge which delimits at least one protrusion of the support plate, and wherein said at least one protrusion edge comprises at least one ramp surface, inclined with respect to the radial direction and to the tangential direction; said at least one ramp surface forming an abutment reference for said at least one thrust surface of either said at least one disc-inlet-side thrust portion or said at least one disc-outlet-side thrust portion of the spring device which biases said at least one brake pad in axial, tangential and inner radial directions, so that, by pressing said at least one brake pad in outer radial direction against the convex surface of the cradle of said at least on disc inlet thrust portion and of said at least one disc-outlet-side thrust portion of the spring device, said at least one ramp surface of the support plate puts in traction the spring body of said spring device between said disc-inlet-side thrust portion and said disc-outlet-side thrust portion, providing an assembly preload to the spring device.

According to an aspect of the invention, a brake caliper for a disc brake comprises a caliper body adapted to straddle the disc and at least one brake pad assembly, wherein said caliper body comprises two opposite elongated elements, each adapted to face a braking surface of the disc, either directly or indirectly by means of said at least one brake pad, and at least one caliper bridge which connects said two elongated elements to each other; said spring device is coupled by snapping by means of its coupling portion to the caliper bridge and biases at least one brake pad in axial direction away from the disc, in inner radial direction, and in tangential direction opposite to the rotation direction of the disc to contrast the tangential acceleration of the brake pad during the braking action; and wherein during the braking action, said at least one brake pad applies traction to the spring body of said spring device between said coupling portion and at least either said disc-inlet-side thrust portion or said disc-outlet-side thrust portion.

FIGURES

Further features and advantages of the caliper body, of the pad and spring assembly, of the brake caliper and of the disc brake according to the invention will be apparent from the description provided below of preferred embodiments thereof, given for illustrative but not limiting purposes, with reference to the accompanying drawings, in which.

DESCRIPTION OF SOME PREFERRED EMBODIMENTS

Figure 1:
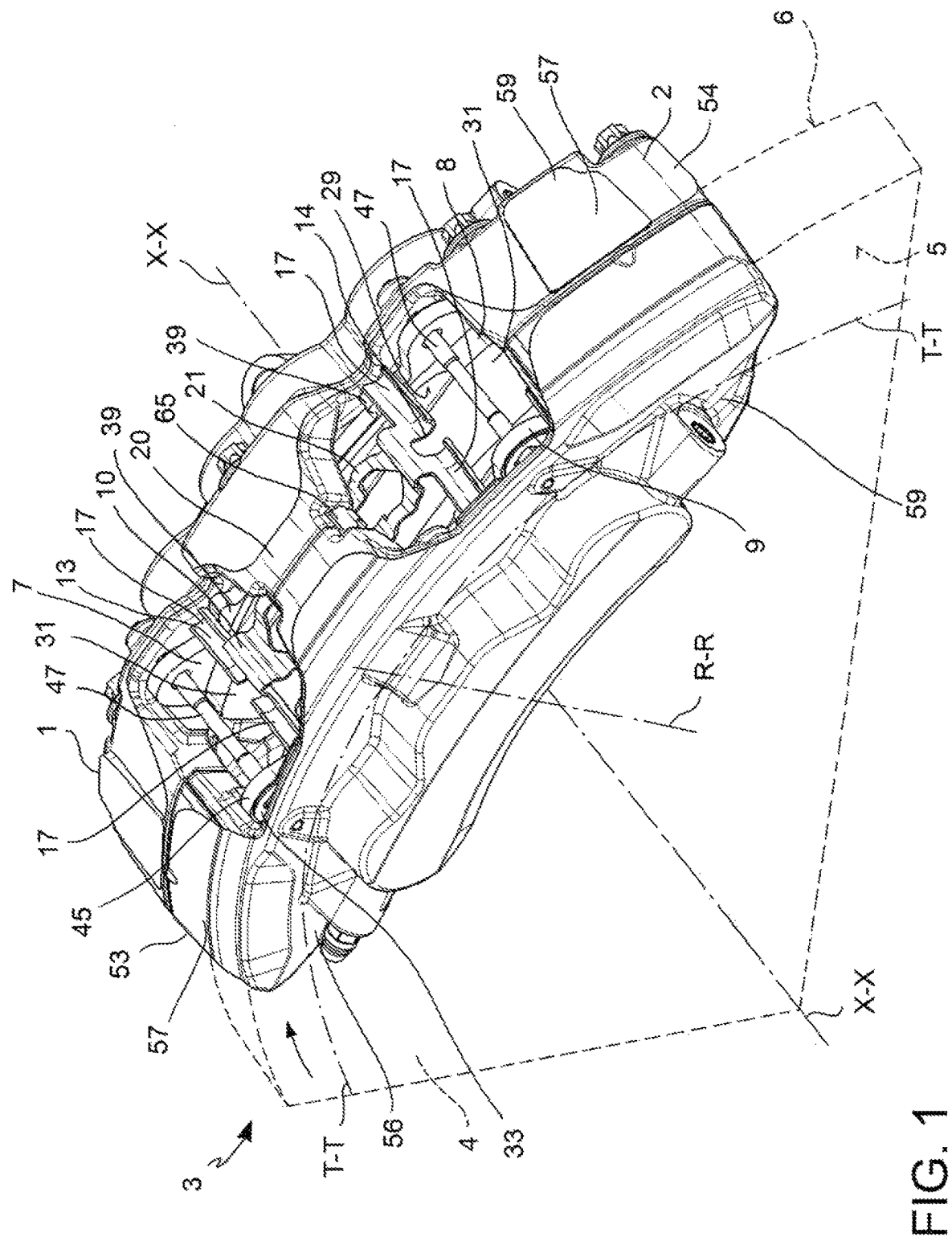
FIG. 1 is a radially outer axonometric view of a disc brake.
Figure 2:
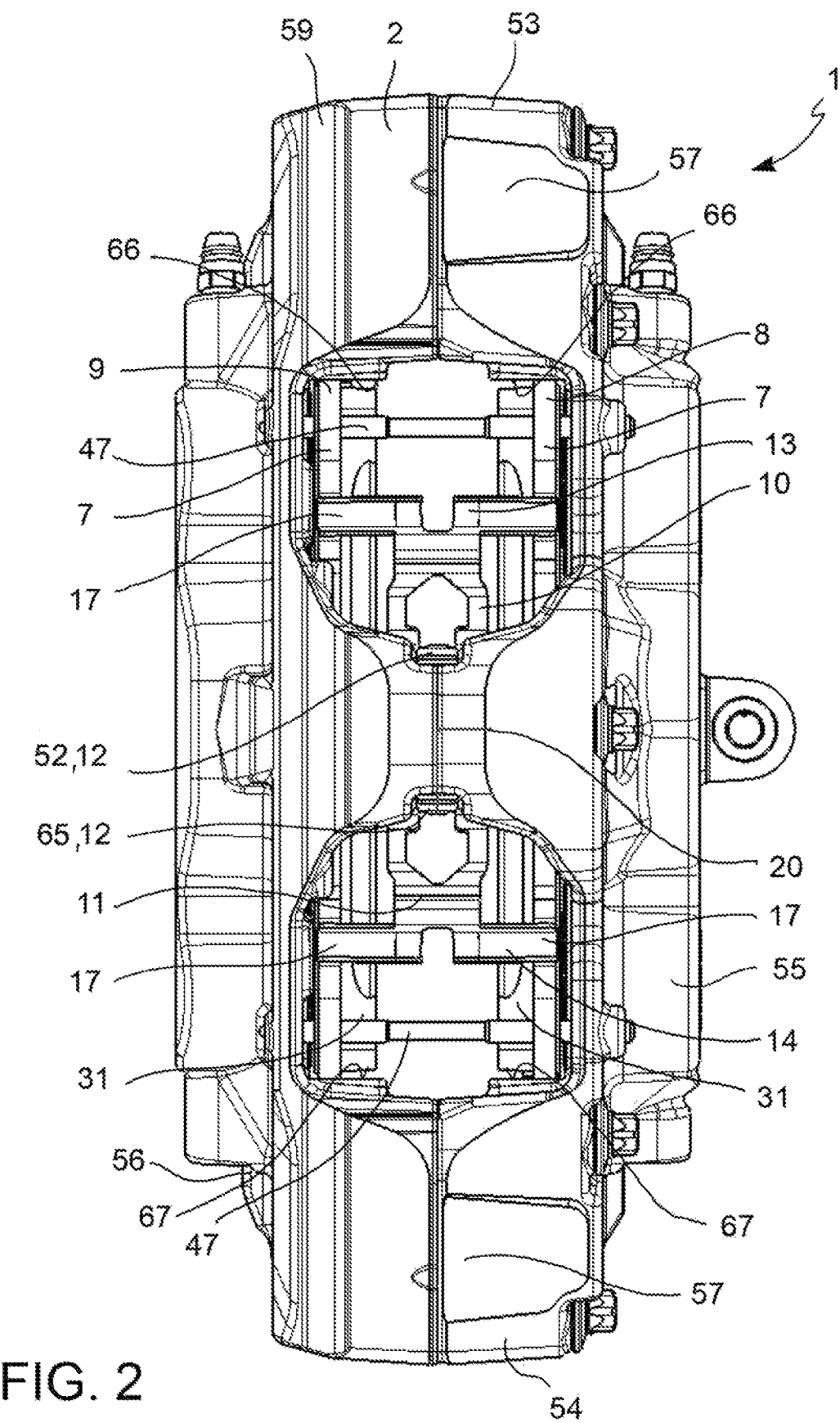
FIG. 2 is a radially outer plan view of a disc brake.
Figure 3:
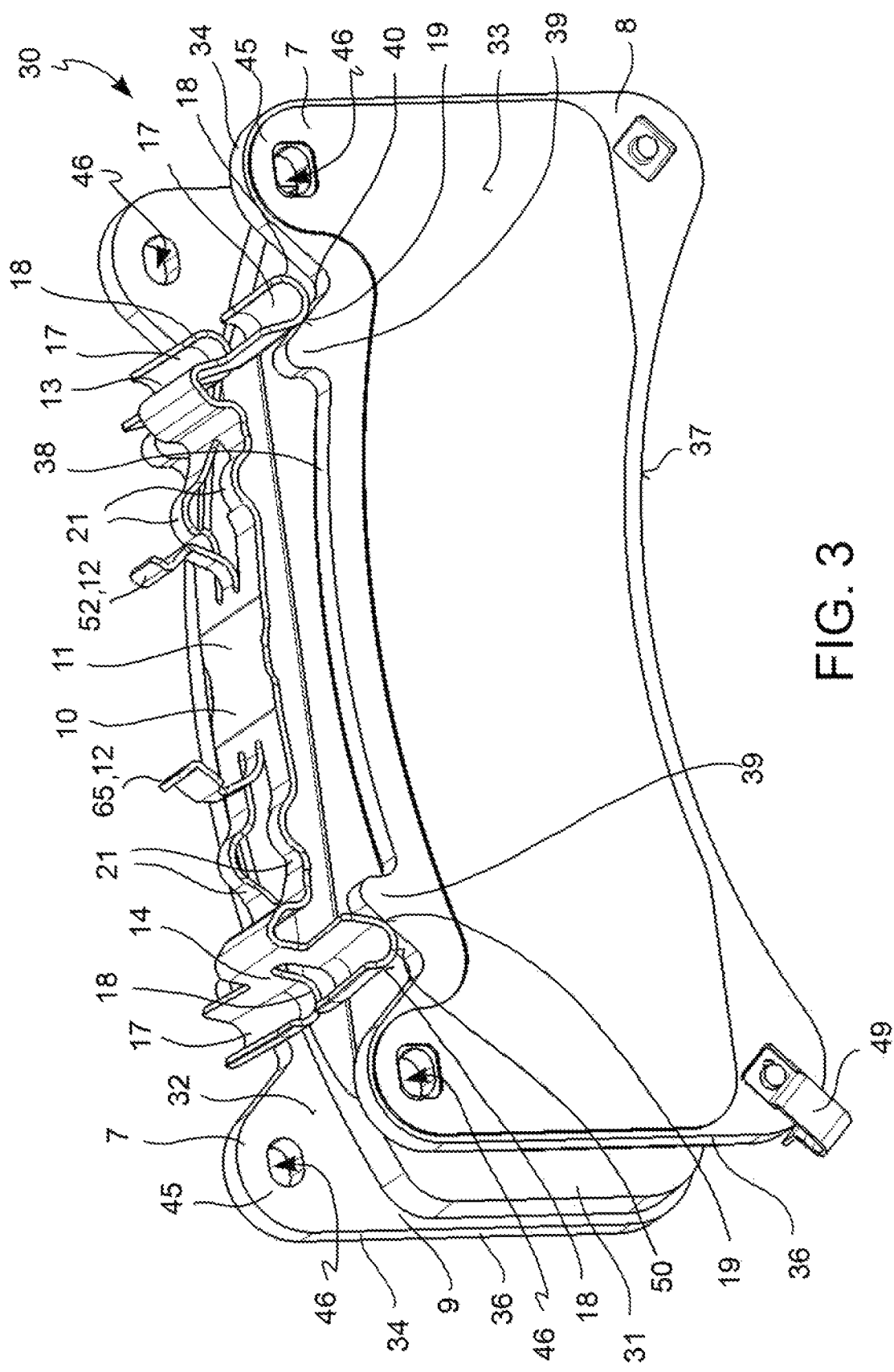
FIG. 3 is an axonometric view of a pad and spring assembly comprising two opposite brake pads.
Figure 4:
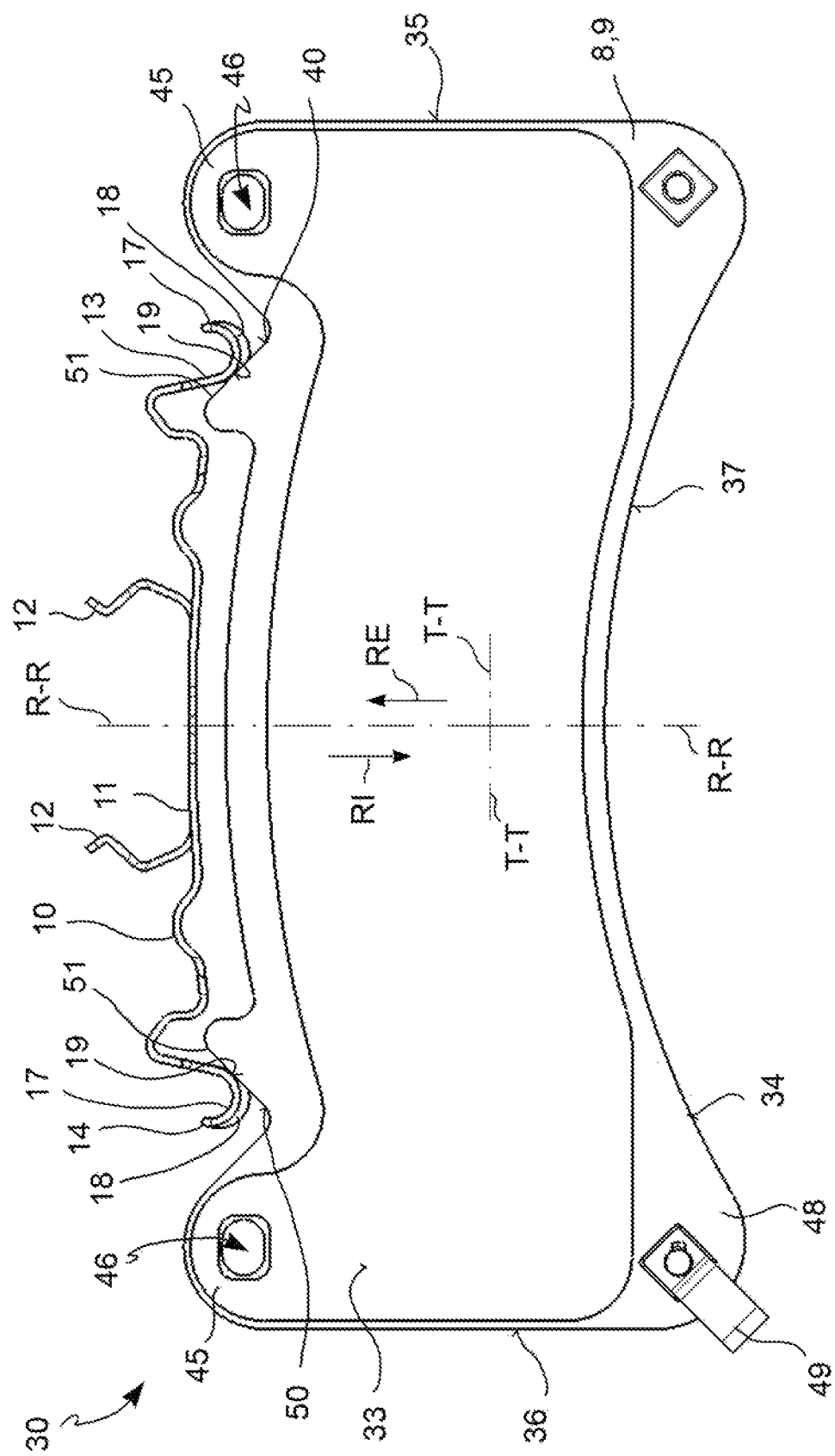
FIG. 4 shows a plan view of a pad and spring assembly from the back of the support plate.
Figure 5:
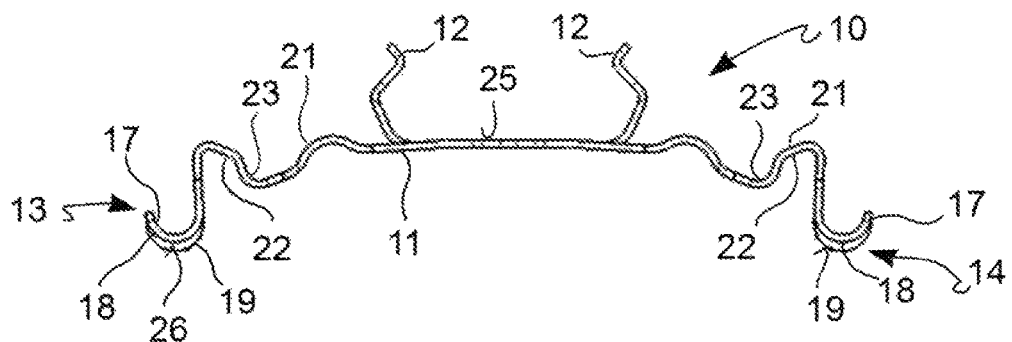
FIG. 5 shows a plan view of a spring device.
Figure 6:
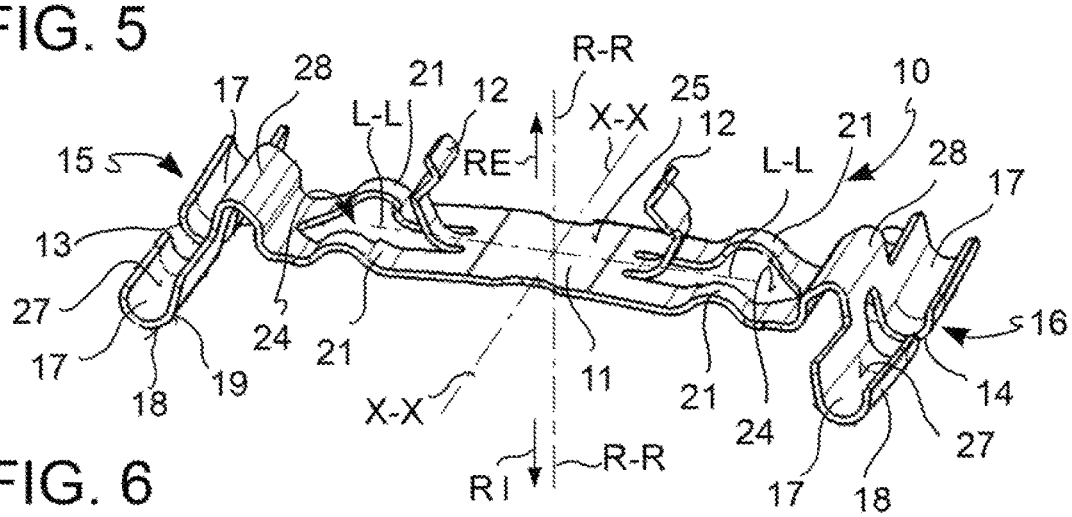
FIG. 6 shows a radially outer axonometric view of a spring device.
Figure 7:
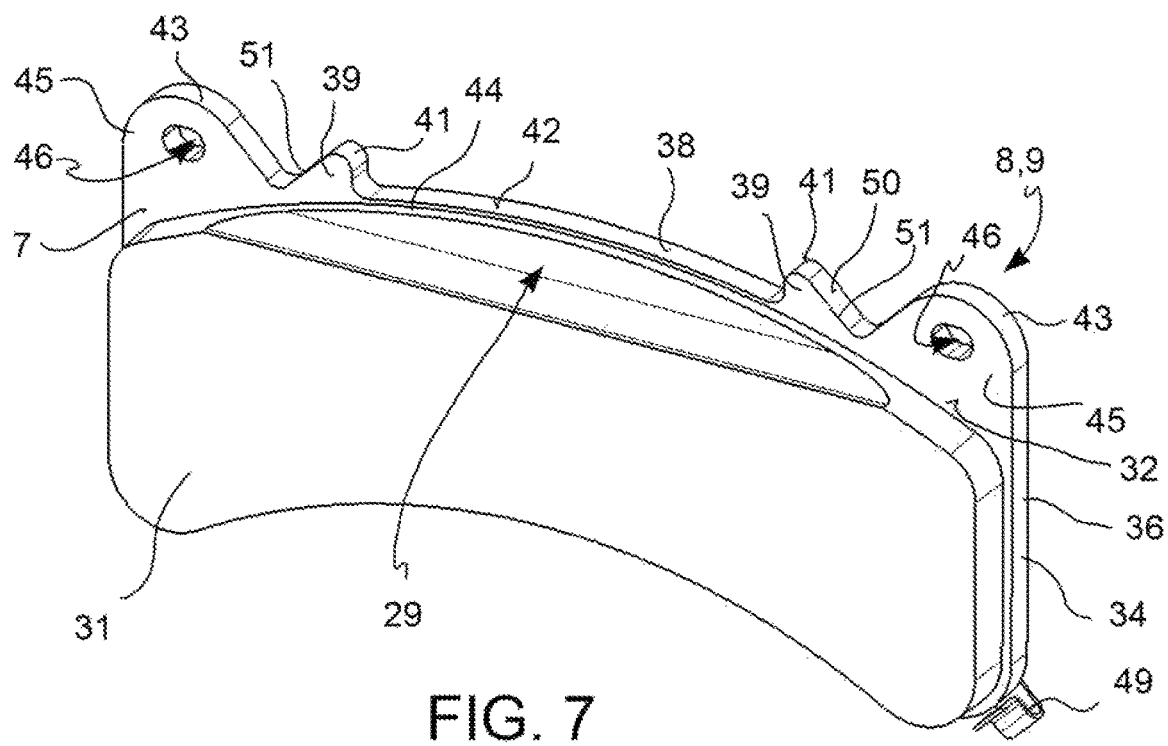
FIG. 7 is an axonometric view of a brake pad.
Figure 8:
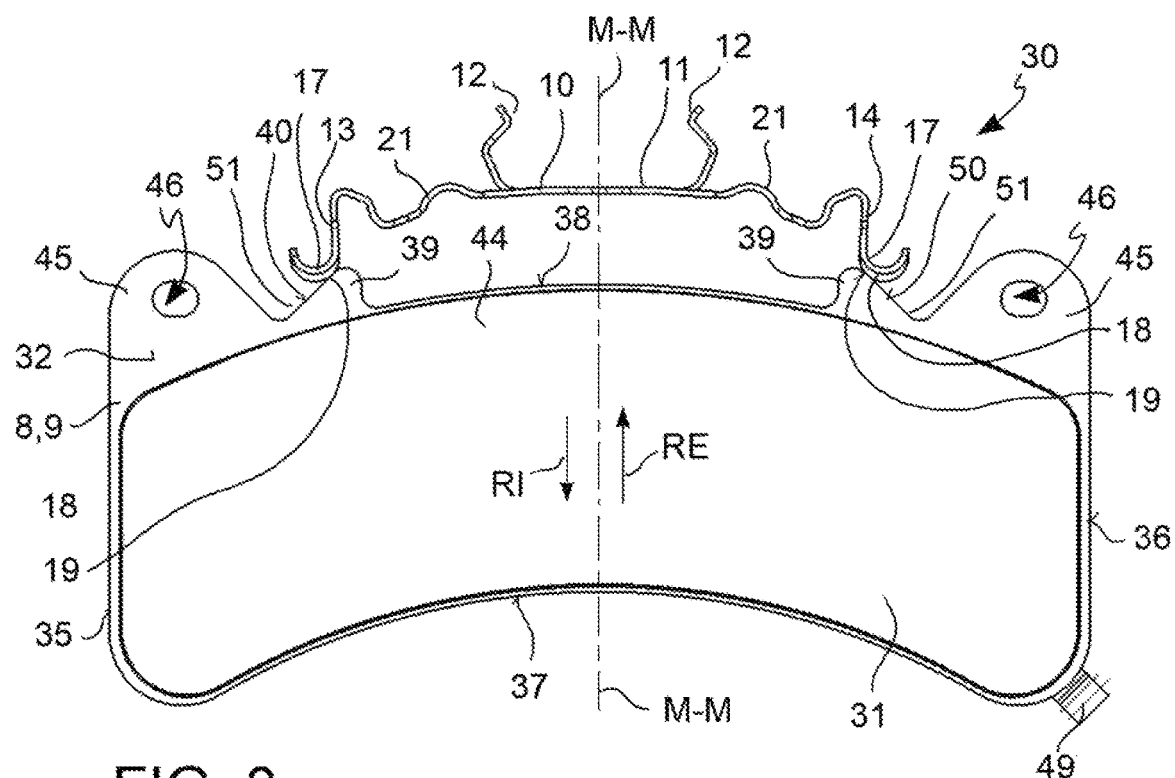
FIGS. 8 and 9 shows a plan view of the assembly of a brake pad to a spring device, according to an embodiment.

According to a general embodiment, a spring device 10 for a disc brake 3 is provided.

Said disc brake comprises a disc 4 and a brake caliper 1 having a caliper body 2 adapted to straddle the disc 4 and at least one brake pad 8, 9 adapted to press against a facing braking surface 5, 6 of the disc 4 when biased by thrust means, e.g. a cylinder-piston assembly, of the brake caliper 1.

Said disc brake 3 defines an axial direction X-X either parallel to or coinciding with the rotation axis of the disc 4, a radial direction R-R orthogonal to the axial direction X-X, and a tangential T-T or circumferential direction T-T, orthogonal to both the axial direction X-X and to the radial direction R-R. A radially inner direction, or radially inner direction RI, directed in radial direction R-R towards the rotation axis of the disc 4, and an opposite radially outer direction, or outer radial direction RE, are also defined. Said axial X-X, radial R-R, radial inner RI, radial outer RE and tangential T-T directions are defined on a brake pad 8, 9 also when it is considered alone.

Furthermore, when the vehicle on which the disc brake 3 is mounted proceeds forwards, a forward travel rotation direction of the disc 4 is defined, which defines a disc inlet side 53 and an opposite disc outlet side 54 in the body of the brake caliper 1. In other words, considering a reference segment of the disc 4 rotating in the forwards travel rotation direction, said reference segment first encounters said disc inlet side 53, then the opposite brake pads 8, 9 associated with the brake caliper 1, and then said disc outlet side 54.

Said spring device 10 comprises a spring body 11 having prevalent longitudinal development which defines a longitudinal development axis L-L of the spring body 11. Preferably, in working position, said spring body 11 extends along the tangential direction T-T, so that the longitudinal development of a prevalent portion of the spring body 11 is substantially parallel to the tangential direction T-T.

Said spring body 11 comprises at least one coupling portion 12, to connect by snapping said spring device 10 to a portion of a brake caliper 2 of a brake caliper 1 for a disc brake 3 in removable manner. For example, said at least one coupling portion 12 is adapted to couple by snapping to a bridge of the brake caliper 1 and preferably to a central caliper bridge 20.

Said spring body 11 further comprises at least one disc-inlet-side thrust portion 13, or first thrust portion 13, and at least one disc-outlet-side thrust portion 14, or second trust portion 14, longitudinally opposite to said disc-inlet-side thrust portion 13 with respect to said coupling portion 12 of the trust body 11. The expression "thrust portions 13, 14" means said first thrust portion 13 and said second thrust portion 14.

Said first thrust portion 13 and said at least second thrust portion 14 are intended to bias at least one brake pad 8, 9 in axial direction X-X away from the disc 4, in inner radial direction RI, and in tangential direction T-T in opposition to the rotation direction of the disc 4 to contrast the tangential acceleration of the brake pad 8, 9 during the braking action. Preferably, said first thrust portion 13 and said second thrust portion 14 elastically bias said at least one brake pad 8, 9. According to an embodiment, said spring body 11 comprises two opposite end portions 15, 16 each comprising at least one thrust portion 13, 14.

Each of said at least one disc-inlet-side thrust portion or first thrust portion 13, and said one disc-outlet-side thrust portion 14 or second thrust portion 14, comprises at least one cradle 17 comprising a convex surface 18, which in working position substantially faces the inner radial direction RI and is adapted to face the at least one brake pad 8, 9.

Said convex surface 18 of the at least one cradle 17 comprises a thrust surface 19, adapted to form an axial, tangential and radial abutment reference for at least one portion of a support plate 7 of the at least one brake pad 8, 9.

Thereby, by pressing against said convex surface 18 of the cradle 17 of each of said at least one disc-inlet-side thrust portion 13 and of disc-outlet-side thrust portion 14, said at least one pad 8, 9 puts in traction the spring body 11 of said spring device 10, providing an assembly preload to the spring device 10.

In other words, during the assembly of the spring device 10 with the at least one brake pad 8, 9, the spring body 11 is subject to traction between said disc-inlet-side thrust portion 13 and said disc-outlet-side thrust portion 14.

In yet other words, when said at least one brake pad 8, 9 presses, e.g. during the assembly of the brake pad 8, 9, against said convex surface 18 of the cradle 17 of each said at least one disc-inlet-side thrust portion 13, and said disc-outlet-side thrust portion 14 of the spring device 10, it determines a traction biasing of the spring body 11 which tends to distend the spring body 11 longitudinally, concurrently pressing it radially, thus allowing the loading of the spring device 10 in order to make it suitable for applying a thrust at least in the radially inner direction RI.

The provision of a spring device 10 which is traction-loaded allows to reduce the radial dimension of the spring body 11 when in working position with respect to the radial dimension of the spring device 10 when in resting position, and concurrently to obtain a spring device 10 adapted to apply a preload to at least one associable brake pad 8, 9. Furthermore, the provision of a traction-loaded spring device 10 allows to reduce the radial dimension of the spring body 11 as compared to known solutions which, for example, include a compression-loaded spring by pulling it radially inside.

By virtue of the geometric conformation of said at least one disc-inlet-side thrust portion 13, and said disc-outlet-side thrust portion 14 each comprising a cradle 17 which faces a convex surface 18 to the plate 7 of an associable brake pad 8, 9, said spring device 10 is adapted to bias at least one brake pad 8, 9 in axial direction X-X away from the disc 4, in tangential direction T-T in opposition to the rotation direction of the disc 4, and in radial direction R-R in said radially inner direction RI.

According to an embodiment, when in resting position, said spring body 11 of said spring device 10 is substantially arch-shaped. When said spring device 10 is in resting position, the radial dimension of said spring body 11 is greater than when said spring device 10 is in working position. When said spring device 10 is in working position, the radial dimension of said spring body 11 is greater than when said spring device 10 is in resting position.

According to an embodiment and in working position, said spring device 10 is subject to a traction action between said coupling portion 12 and at least either said at least one disc-inlet-side thrust portion 13 or said disc-outlet-side thrust portion 14. In other words, during the braking action, said spring device 10 is subject to a traction reaction between said coupling portion 12 and at least one of either said at least one disc-inlet-side thrust portion 13 or said disc-outlet-side thrust portion 14. Preferably, when the braking occurs in forward traveling conditions of the vehicle on which the disc brake is mounted, the traction bias between said coupling portion 12 and said disc-outlet-side thrust portion 14 is greater than the traction bias between said coupling portion 12 and said at least one disc-inlet-side thrust portion 13.

According to an embodiment, said spring body 11 comprises at least a first thrust portion 13, or disc-inlet-side thrust portion 13, and at least a second thrust portion 14, or disc-outlet-side thrust portion 14, longitudinally opposite to said disc-inlet-side thrust portion 13 with respect to said coupling portion 12 of the spring body 11, and said coupling portion 12 comprises at least one disc-inlet-side arm 52 and an opposite disc-outlet-side arm 65, and wherein during the braking action, the at least one brake pad 8, 9 puts in traction the spring body 11 of said spring device 10 between said disc-inlet-side thrust portion 13 and said disc-outlet-side coupling arm 65 and between said disc-outlet-side thrust portion 14 and said disc-inlet-side coupling arm 52, providing a reaction to the acceleration of the brake pad 8, 9.

According to an embodiment, said spring device 10 comprises a radially outer side 25, facing in radially outer direction RE when in working position, and an opposite radially inner side 26, facing radially inner direction RI when in working position, in which said radially inner side 26 comprises said thrust surface 19. According to an embodiment, said radially inner side 26 comprises said convex surface 18 and said radially outer side 25 comprises a corresponding convex surface 27.

According to an embodiment and in working position, said at least one cradle 17 extends radially internally with respect to said coupling portion 12.

According to an embodiment, said convex surface 18 of the cradle 17 is sloping towards the longitudinal development axis L-L of the spring body 11. Thereby, said convex surface 18 can face, in working position, the axial direction X-X, in addition to the radially inner direction RI and the tangential direction T-T.

Preferably, said convex surface 18 of said cradle 17 comprises at least one cylindrical surface portion, having inclined axis with respect to the axial direction X-X.

According to an embodiment, said thrust surface 19 is substantially a contact line between said convex surface 18 of the cradle 17 and a portion of an associable brake pad 8, 9, and preferably said thrust surface 19 has a substantially punctiform extension. Thereby, it is possible to control the bias of the spring device 10 on the brake pad 8, 9 allowing an accurate dimensioning of the biasing of the spring device 10 on the brake pad 8, 9 independently from the geometric construction tolerances of the brake pad 8, 9 and of the central caliper bridge 20 of the brake caliper 1.

According to an embodiment, each said at least one disc-inlet-side thrust portion 13 and said disc-outlet-side thrust portion 14 comprises two opposite cradles 17 sloping towards the longitudinal development axis L-L of the spring body 11. In other words, the extensions of the convex surfaces 18 of said opposite cradles 17 are mutually converging in a radially inner portion of the spring body 11, when in working position. Thereby, said spring device 10 can bias two opposite brake pads 8, 9 both axially away from the disc 4, which tangentially and radially towards the disc rotation axis.

Preferably, said two opposite cradles 17 branch from a single portion of the spring body 11 or fork portion 28 of the spring body.

According to an embodiment and in working position, said spring body 11 of the spring device 10 extends longitudinally along the tangential direction T-T and has symmetric shape with respect to a definable middle plane substantially orthogonal to the axial direction X-X and passing through the longitudinal development axis L-L of the spring body 11.

According to an embodiment and in working position, said spring body 11 comprises four cradles 17 at the tangential and axial ends of the spring body 11. Thereby, said spring device 10 can bias two opposite brake pads 8, 9 both axially away from the disc 4, both tangentially in forward travel conditions and in reversing condition, and radially towards the disc rotation axis.

According to an embodiment, said coupling portion 12 comprises at least one coupling clip which protrudes projecting from said spring body 11. Preferably, when in working position, said at least one coupling clip extends in outer radial direction RE from said spring body 11.

According to an embodiment, said coupling portion 12 comprises at least two opposite arms 52, 65 which protrude substantially projecting from said spring body 11, so to extend non-parallel to the longitudinal development axis L-L of the spring body 11.

According to an embodiment, said first coupling portion 12 is adapted to embrace a radially inner portion of the central caliper bridge 20. Preferably, said coupling portion 12 is adapted to couple by snapping against undercut portions of the central caliper bridge 20.

According to an embodiment, said spring device 11 comprises at least one elastic arm 21 which connects said coupling portion 12 and at least one of either said at least one disc-inlet-side thrust portion 13 and or disc-outlet-side thrust portion 14. According to an embodiment, said at least one elastic arm 21 forms at least one loop 22, 23. By providing at least one loop 22, 23 on said at least one elastic arm 21, the relative displacement of at least either said at least one disc-inlet-side thrust portion 13 or said disc-outlet-side thrust portion 14 with respect to the coupling portion 12 of the spring body 11 is made substantially linear, predictable and controllable. Preferably, said at least one arm 21 forms at least two opposite loops 22, 23.

According to an embodiment, said spring device 10 is a spring leaf. Preferably, said spring device 10 is made in one single piece. According to an embodiment, said spring device 10 is made by shearing and folding a single metal sheet. Thereby, said coupling portion 12 is made in form of the at least one appendix incising the profile of the single metal sheet 11 so that it can be folded by substantially protruding overhangingly from the radially outer surface 25 of the spring body 11. Preferably, making said coupling portion 12 in such a manner implies the formation of at least elastic arms 21 side-by-side on the spring body 11 which at least partially delimit a spring window 24.

According to a general embodiment, a pad and spring assembly 30 is provided. Said pad and spring assembly 30 comprise at least one brake pad 8, 9 and at least one spring device 10, according to any one of the embodiments described above. Said at least one brake pad 8, 9 comprises at least one friction material 31 and at least one support plate 7, said at least one support plate 7 comprising a friction surface 32 with which said friction material 31 is associated, an opposite plate back 33, adapted to form an abutment reference of a brake caliper 1 which can be associated with the brake pad 8, 9, and a plate edge 34 which delimits said friction surface 32 and said opposite plate back 33.

Said plate edge 34 comprises a first flank 35, or disc-inlet-side flank 35, and second opposite flank 36, or disc-outlet-side flank 36, wherein said first flank 35 and said second flank 36 are substantially facing in tangential direction T-T, and are adapted to transfer the braking action from the at least one brake pad 8, 9 to the body of an associable brake caliper 1.

Said plate edge 34 further comprises a first radially inner edge 37, either facing or directed in radially inner direction RI, and a second radially outer edge 38, either facing or directed in radially outer direction RE.

Said radially outer edge 38 comprises at least one protrusion edge 41 which delimits at least one protrusion 39 of the support plate 7, and wherein said at least one protrusion edge 41 comprises at least one ramp surface 40, 50, facing radial direction R-R and in tangential direction T-T, and inclined with respect to the radial direction R-R and to the tangential direction T-T. According to an embodiment, said at least one ramp surface 40, 50 is inclined so that an extension thereof encounters a definable median axis M-M of the brake pad 8, 9, said median axis M-M being parallel to the radial direction R-R, in a portion radially outside said radially outer portion 38 of the support plate 7.

Said at least one ramp surface 40, 50 forms an abutment reference for said at least one thrust surface 19 of at least either said at least one disc-inlet-side thrust portion 13 and said disc-outlet-side thrust portion 14 of the spring device 10.

Preferably, said radially outer edge 38 of the support plate 7 comprises two separate protrusions 39, tangentially opposite with respect to said median axis M-M, wherein each of said two separate protrusions comprises a ramp surface 40, 50, so that said radially outer edge 38 of the support plate 7 comprises two opposite ramp surfaces 40, 50. Preferably, said two opposite ramp surfaces 40, 50 comprise a first ramp surface 40, or disc-inlet-side ramp surface 40, and a second opposite ramp surface 50, or disc-outlet-side ramp surface 50. Preferably, said disc-inlet-side ramp surface 40 forms an abutment reference for said at least one thrust surface 19 of the disc-inlet-side thrust portion 13 of the spring device 10 and said disc-outlet-side ramp surface 50 forms an abutment reference for said at least one thrust surface 19 of the disc-outlet-side thrust portion 14 of the spring device 10. According to an embodiment, the extensions of said two opposite side ramps 40, 50 converge in a portion radially outside the outer radially edge 38 of the support plate 7.

Said at least one thrust surface 19 biases said at least one brake pad 8, 9 in axial X-X, tangential T-T and inner radial RI directions, so that, by pressing said at least one brake pad 8, 9 in outer radial direction RE against the convex surface 18 of the cradle 17 of said at least on disc inlet thrust portion 13 and of said one disc-outlet-side thrust portion 14 of the spring device 10, said at least one ramp surface 40, 50 of the support plate 7 puts in traction said spring device 10 between said disc-inlet-side thrust portion 13 and said disc-outlet-side thrust portion 14.

The provision of said at least one ramp surface 40, 50 determines a relative separation between said disc-inlet-side thrust portion 13 and said disc-outlet-side thrust portion 14 during the assembly of the at least one brake pad 8, 9 with the spring device 10.

The provision of said at least one brake pad 8, 9 comprising said two opposite protrusions 39, each comprising a ramp surface 40, 50 so that two opposite ramp surfaces are provided, improves the relative separation between said disc-inlet-side thrust portion 13 and said disc-outlet-side thrust portion 14 during the assembly of the at least one brake pad 8, 9 with the spring device 10.

Preferably, said at least one thrust surface 19 elastically biases said at least one brake pad 8, 9.

Preferably, said ramp surface 40, 50 comprises an axially inner arris 51 which delimits said ramp surface 40, 50 and said friction surface 32 of the protrusion 39. Preferably, said axially inner arris 51 of the ramp surface 40, 50 comprises a contact portion between the brake pad 8, 9 and the thrust surface of the spring device 10. Preferably, the contact portion between the axially inner arris 51 of the ramp surface 40, 50 and the thrust surface 19 of the spring device 10 is substantially punctiform.

The provision of a thus made ramp surface 40, 50 avoids providing undercut niches in the support plate 7, whereby simplifying manufacturing and assembly, e.g. during the step of mounting, of the pad and spring assembly 30.

The provision of a thus made pad and spring 30 assembly allows to keep the spring device 10 preloaded and abutting on the support plate 7 of the at least one brake pad 8, 9.

During the braking action, said at least one ramp surface 40, 50 of the brake pad 8, 9 put in traction the spring body 10 between said coupling portion 12 and at least either said disc-inlet-side thrust portion 13 or said disc-outlet-side thrust portion 14.

Preferably, said ramp surface 40, 50 is a substantially flat surface inclined with respect to the tangential direction T-T and to the radial direction R-R. In other words, said axially inner arris 51 of the ramp surface 40, 50 is substantially rectilinear and inclined with respect to the tangential direction T-T and to the radial direction R-R. Thereby, it is possible to control, by making the system substantially linear, and to provide the biasing action of the spring device 10 on the support plate 7 of the at least one brake pad 8, 9, and concurrently allows said spring device 10 to bias the brake pad 8, 9 both axially away from the disc 4, in radial inner direction RI, and in tangential direction T-T to contrast the acceleration of the brake pad 8, 9 with respect to the caliper body 2 during the braking action.

According to a preferred embodiment, said disc-inlet-side flank 35 and said disc-outlet-side flank 36 of the support plate 7 avoid delimiting protrusions or appendixes of the support plate 7. Preferably, said radially inner edge 37 of the support plate 7 also allows to delimit protrusions or appendixes of the support plate 7.

According to an embodiment, said radially outer edge 38 of the support plate 7 comprises a radially outer edge central portion 42 and opposite radially outer edge side portions 43, tangentially by the side of said radially outer edge central portion 42, wherein at least one of said radially outer edge side portions 43 comprises said ramp surface 40, 50. Preferably, each of said radially outer side portions 43 extends for approximately by one third of the extension in tangential direction T-T of the support plate 7. Preferably, said radially outer edge central portion 42 is free from appendixes or protrusions.

According to an embodiment, each of said radially outer edge side portions 43 delimits ears 45 of the support plate 7 which extend substantially in outer radial direction RE, said ear delimits a guiding seat 46, either open or closed, for receiving a guiding pin 47 of a brake caliper 1 associable to the pad and spring assembly 30, so as to guide the displacement in axial direction X-X of the at least one brake pad 8, 9.

According to an embodiment, said at least one ramp surface 40, 50 is joined to the side portion of the radially outer edge surface 43 which delimits said ear 45.

According to an embodiment, said pad and spring assembly 30 comprises two opposite brake pads 8, 9 and a spring device 10 comprising four cradles 17 at the tangential and axial ends of the spring body 11, each cradle 17 comprising said at least one thrust surface 19, so as to influence said two opposite brake pads 8, 9 simultaneously both in axial direction X-X away from the disc 4, and in inner radial direction RI, and in tangential direction T-T to contrast the tangential acceleration of the brake pad 8, 9 during the braking action.

According to an embodiment, the friction material 31 comprises a radially outer portion of friction material 44 having reduced extension in axial direction X-X, to allow said convex surface 18 of the at least one thrust portion 13, 14 of the spring device 10 to be positioned axially inclined, or sloping, to bias said at least one brake pad 8, 9 in axial direction X-X away from the disc 4. In other words, said radially outer portion of friction material 44 of reduced extension in axial direction X-X allows to accommodate said at least one thrust portion 13, 14 of the spring device 10 in the axial space between opposite brake pads 8, 9, so that the thrust surface of the cradle 17 of the thrust portion 13, 14 is axially inclined or sloping to bias at least one brake pad away from the disc 4 by pushing against said ramp surface 40, 50 of the support plate 7. According to an embodiment, said radially outer portion of friction material 44 delimits an axially accessible recess 29, in which the bottom wall of said recess 29 may consist of said friction surface 32 of the support plate 7.

Figure 9:
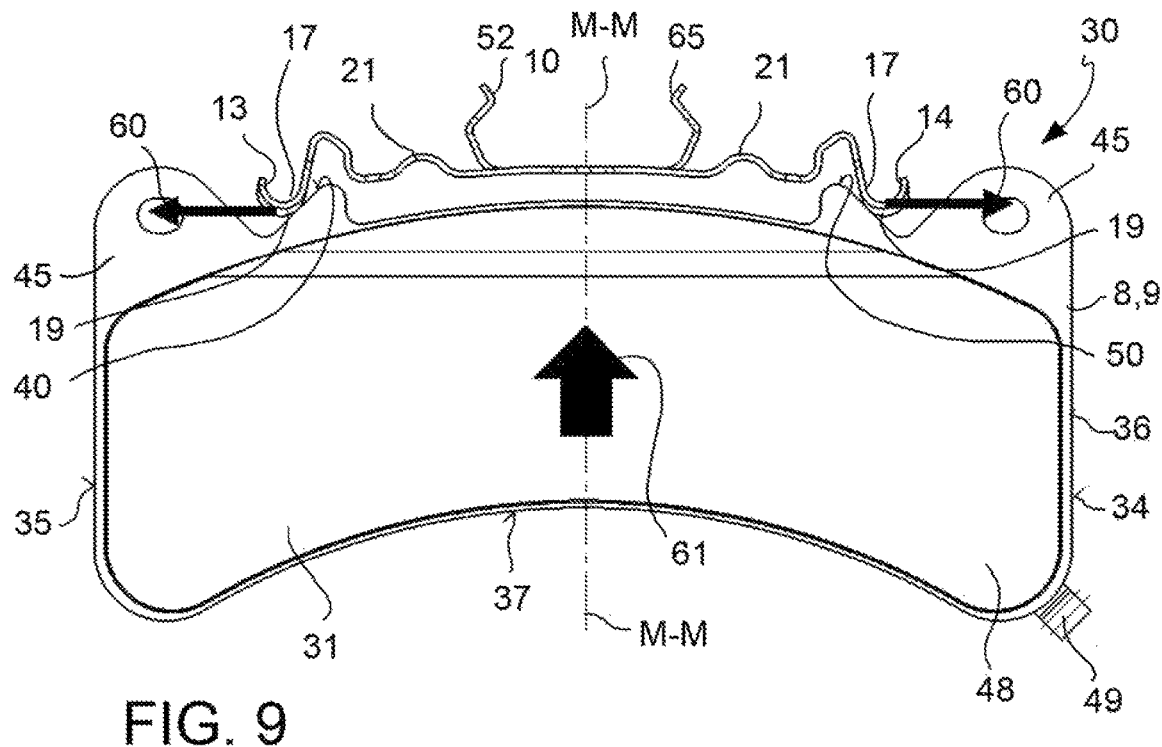

As shown for example in FIG. 9, when a brake pad 8, 9 is pressed in radial outer direction RE against said spring device 10, as shown by the arrow 61 in FIG. 9, e.g. during the step of assembling, said opposite ramp surfaces 40, 50 determine a relative separation 61 of the thrust portions 13, 14 of the spring body 11 which provides the radial dimension of the spring body 11, puts in traction the spring device 10 between said disc-inlet-side thrust portion 13 and said disc-outlet-side thrust portion 14, providing an assembly preload to the spring device 10. Thereby, the thrust surfaces 19 of the cradles 18 of the thrust portions 13, 14 of the spring device 10 bias the at least one brake pad 8, 9 both in axial direction X-X away from the disc 4, in radial inner direction RI, and in tangential direction T-T to contrast the tangential acceleration of the brake pad 8, 9 during the braking action.

During the braking action, said spring device 10 is subject to a traction reaction between said coupling portion 12 and either a disc-inlet-side thrust portion 13 and said disc-outlet-side thrust portion 14.

According to an embodiment, said support plate 7 of the at least one brake pad 8, 9 comprises a disc outlet angle portion 48, delimited by a radially inner portion of the disc-outlet-side flank 36 and by a portion of the radially inner edge 37 of the plate edge 34, in which said disc outlet angle portion 48 is associated with at least one elastic element 49, adapted to rest on a portion of the body of an associable brake disc 1 to bias said at least one brake pad 8, 9 at least in radial outer direction RE and in tangential direction T-T to contrast the tangential acceleration of the brake pad 8, 9 during the braking action. Preferably, said elastic element 49 is adapted to apply a preload on the brake pad 8, 9. According to an embodiment, said elastic element 49 is adapted to bias said at least one brake pad 8, 9 and in axial direction X-X away from the disc 4. Preferably, said elastic element 49 is a laminated spring. Preferably, said elastic element 49 is a leaf spring. Preferably, said elastic element 49 is fixed by means of fixing means to a plate back portion 33.

According to a general embodiment, a brake caliper 1 for a disc brake 3 is provided. Said brake caliper 1 comprises a caliper body 2, adapted to be arranged straddling a disc 4 having opposite braking surfaces 5, 6 and at least one pad and spring assembly 30, according to any one of the embodiments described above.

Said caliper body 2 comprises two opposite elongated elements 55, 56, each of which is adapted to face a braking surface 5, 6 of the disc 4 either directly or indirectly by means of said at least one brake pad 8, 9. Said caliper body 2 comprises at least one caliper bridge 20, 57 which connects said two elongated elements 55, 56 to each other. Said at least one caliper bridge 20 may be a central caliper bridge 20 or a caliper end bridge 57, in which preferably said caliper central bridge 20 is tangentially interposed between said at least two caliper end bridges 57. Preferably, said central caliper bridge 20 is on the extension of said median axis M-M of the brake pad 8, 9. Said caliper body 2 further comprises a disc inlet side 53 and a disc outlet side 54.

Preferably, said spring device 10 is coupled by snapping by means of its coupling portion 12 to the caliper bridge 20, 57 and biases at least one brake pad 8, 9 in axial direction X-X away from the disc 4, in inner radial direction RI, and in tangential direction T-T opposite to the rotation direction of the disc 4 to contrast the tangential acceleration of the brake pad 8, 9 during the braking action.

Said spring device 10 couples by snapping by means of its coupling portion 12 to the central caliper bridge 20. Thereby, said spring device 10 can apply a substantially balanced biasing action. According to a variant, said spring device 10 couples by snapping by means of its coupling portion 12 to the caliper end bridge 57.

During the braking action, said at least one ramp surface 40, 50 of the at least one brake pad 8, 9 puts in traction the spring body 11 of said spring device 10 between said coupling portion 12 and at least either said disc-inlet-side thrust portion 13 or said disc-outlet-side thrust portion 14. Thereby, a reaction is provided with the acceleration of the at least one pad 8, 9 during the braking action.

Preferably, said coupling portion 12 of the spring device 10 comprises a disc-inlet-side coupling arm 52 and an opposite disc outlet coupling arm 65, so that during the braking action, said at least one ramp surface 40, 50 of the at least one brake pad 8, 9 puts in traction the spring body 11 of said spring device 10 between said disc inlet thrust portion 13 and said disc-outlet-side coupling arm 65 and between said disc-outlet-side thrust portion 14 and said disc-inlet-side coupling arm 52.

Preferably, said central caliper bridge 20 comprises a radially inner bridge side 58, adapted to face the disc 4 of the brake disc 3, and said coupling portion 12 of the spring device 10 embraces at least one bridge inner radial side portion 58 of the caliper central bridge 20. The provision of a thus made coupling portion 12 of the spring device 10 which embraces at least one portion of the radially inner bridge side 58, reduces the dimension in radial direction R-R of the spring device 10 and the pad and spring assembly 30.

According to an embodiment, said central caliper bridge 20 comprises opposite coupling teeth 63 which each form a reference of the undercut coupling of said coupling portion of the spring device 10.

The provision of a thus made coupling portion 12 of the spring device 10 which couples by snapping to the central caliper bridge 20 allows said spring device 10 to work between said central caliper bridge 20 and said ramp surface 40, 50 of the support plate 7 of the at least one brake pad 8, 9.

Preferably, each of said at least two opposite elongated elements 55, 56 comprises an inner caliper side elongated element 64, adapted to face a braking surface 5, 6 of the disc 4 either directly or indirectly by means of said at least one brake pad 8, 9. According to an embodiment, said inner caliper side elongated element 64 of the caliper body 2 comprises pocket walls 66, 67 which delimit at least partially a pad housing pocket. Preferably, said pocket walls 66, 67 comprise at least one disc-inlet-side pocket wall 66 and a disc-outlet-side pocket wall 67.

Providing said disc-inlet-side pocket wall 66 and said disc-outlet side pocket wall 67 allows to form a tangential abutment reference for the disc-inlet-side flank 35 and the disc-outlet-side flank 36, respectively, of the support plate 7 of the at least one brake pad 8, 9, to transmit the braking action of the at least one brake pad 8, 9 to the caliper body 2 of the brake caliper 1.

According to an embodiment, said pocket walls 66, 67, 68 further comprise a radially inner pocket wall 68 for the radial resting of the brake pad 8, 9. Preferably, said elastic element 49 is interposed between said support plate 8, 9 and said pocket walls 66, 67, 68.

According to an embodiment, said caliper body 2 is of the monoblock type.

According to an embodiment, said caliper body 2 comprises two caliper half-bodies 59.

Figure 10:
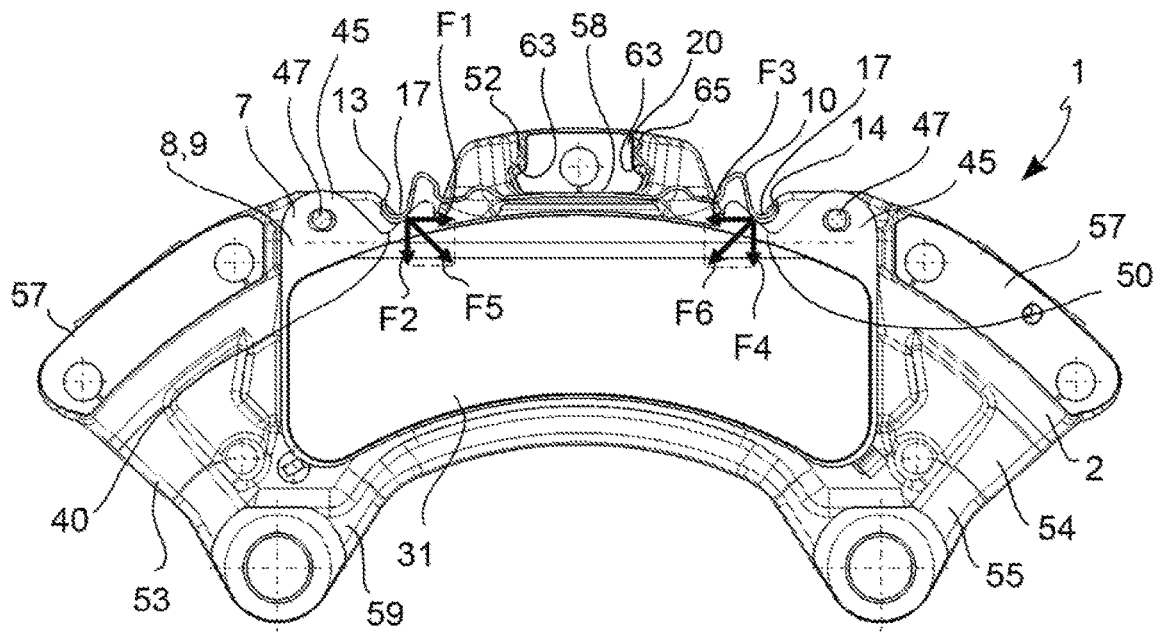
FIG. 10 is a view of a caliper half-body on which a pad and spring assembly is mounted, wherein the biasing actions of the spring device on the brake pad in forward traveling conditions.

As shown, for example, in FIG. 10, when in forward travel conditions of the vehicle on which the disc brake 3 is mounted, the biasing action of the spring device 10 on the opposite ramp surfaces 40, 50 of the support plate 7 of the at least one brake pad 8, 9 is substantially balanced. In other words, the intensity of the disc-inlet side biasing action F5, and particularly of the tangential component of the disc-inlet-side biasing action F1, of the spring device 10 on the disc-inlet-side ramp surface 40 is substantially equal to the opposite disc-outlet-side biasing action F6, and particularly to the tangential component, of the disc-outlet-side biasing action F3, of the spring device 10 on the disc-outlet-side ramp surface 50. FIG. 10 further shows the radial components of the biasing actions F2, F4, substantially equal to one another and directed in radially inner direction RI.

Figure 11:
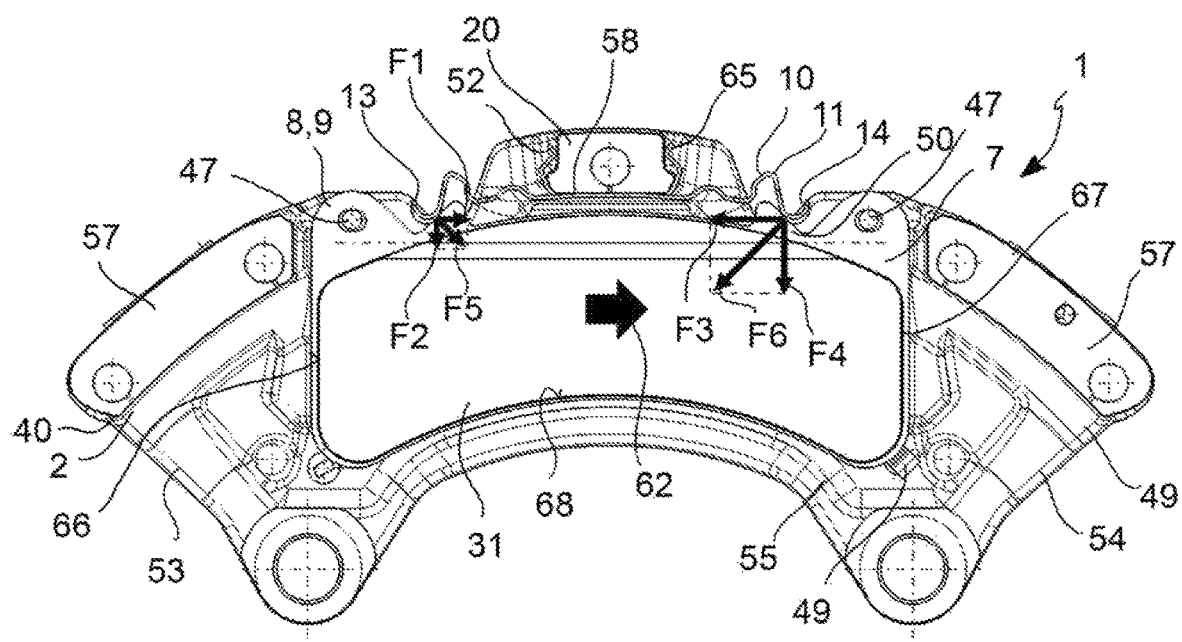
FIG. 11 is a view of a caliper half-body on which a pad and spring assembly is mounted, wherein the biasing actions of the spring device on the brake pad during the braking action.

As shown for example in FIG. 11, when the braking action starts in forward travel conditions of the vehicle on which the disc brake 3 is mounted, the disc-outlet-side biasing action F6 becomes dominating on the disc-inlet-side biasing action F5 to contrast the braking acceleration action 62 of the brake pad 8, 9 with respect to the caliper body 2. In other words, the tangential component of the disc-outlet-side biasing action F3 balances the sum of the action of the braking acceleration 62 and of the tangential component of the disc-inlet-side biasing action F1 and concurrently the radial component of the disc-outlet-side biasing action F4 balances the sum of the radial component of the disc-inlet-side biasing action F2 and the braking acceleration action 62 applied in the center of gravity of the brake pad 8, 9.

According to a general embodiment, a disc brake 3 is provided, comprising at least one brake caliper 3 according to any one of the embodiments described above, and at least one brake disc 4 having opposite braking surfaces 5, 6.

By virtue of the features described above, provided either separately or in combination, where applicable, it is possible to provide a solution for the aforesaid needs and to obtain the aforesaid advantages, in particular:
  a quiet braking action is obtained both in forward travel conditions and in reversing conditions, avoiding the knock noise between a brake pad 8, 9 and the brake pad;
  it allows to contrast the acceleration of the brake pad 8, 9 with respect to the body of the brake caliper 1, during the braking action, subjecting said spring device 10 to a traction reaction between its coupling portion 12 to the brake caliper body 1 and at least one of its opposite thrust portions 13, 14;
  concurrently it allows to reduce the radial dimension of the brake caliper 1 and of the pad and spring assembly 30;
  the device 10 is provided with an assembly preload, putting it in traction between its said opposite thrust portions 13, 14;
  it allows a prompt response of the brake pads 8, 9 during the braking action;
  it allows the simultaneous biasing of two opposite brake pads 8, 9, both in axial direction away from the disc 4, in radial inner direction RI, and in tangential direction T-T to contrast the tangential acceleration of the brake pad 8, 9 during the braking action;
  it allows a rapid and simple assembly of the pad and spring assembly 30, as well as a rapid assembly of the pad and spring assembly 30 on the brake caliper 3.

Those skilled in art may make many changes and adaptations to the embodiments described above or may replace elements with others which are functionally equivalent in order to satisfy contingent needs without however departing from the scope of the appended claims.

LIST OF REFERENCES

1. Brake caliper
2. Caliper body
3. Disc brake
4. Disc
5. Disc braking surface
6. Opposite disc braking surface
7. Support plate
8. Brake pad
9. Opposite brake pad
10. Spring device
11. Spring body
12. Coupling portion
13. Disc-inlet-side thrust portion of the spring device, or first thrust portion
14. Disc-outlet-side thrust portion of the spring device, or second thrust portion
15. Circumferential end of the spring device
16. Opposite circumferential end of the spring device
17. Cradle of the thrust portion
18. Convex surface of the cradle
19. Thrust surface of the spring device
20. Central caliper bridge
21. Elastic arm end of the spring device
22. Loop of the elastic arm
23. Opposite loop of the elastic arm
24. Spring window
25. Radially outer surface of the spring body
26. Radially inner surface of the spring body
27. Concave surface of the cradle
28. Fork portion of the spring body
29. Recess of the friction material
30. Pad and spring assembly
31. Brake pad friction material
32. Support plate friction surface
33. Plate back
34. Plate edge
35. Disc-inlet-side flank of the support plate, or first flank
36. Disc-outlet-side flank of the support plate, or second flank
37. Radially inner edge of the support plate 38. Radially outer edge of the support plate
39. Support plate protrusion
40. Support plate disc-inlet-side ramp surface, or first ramp surface
41. Protrusion edge
42. Radially outer edge central portion
43. Radially outer edge side portion
44. Friction material radially outer portion
45. Support plate ear
46. Guide seat
47. Guide pin
48. Disc outlet angle portion
49. Elastic element
50. Support plate disc-outlet-side ramp surface, or second opposite ramp surface
51. Axially inner arris of the ramp surface
52. Disc-inlet-side coupling arm
53. Brake caliper disc inlet side
54. Brake caliper disc outlet side
55. Elongated element
56. Opposite elongated element
57. Caliper end bridge
58. Radially inner bridge side
59. Caliper half-body
60. Relative separation of the thrust portions of the spring device
61. Arrow
62. Braking acceleration action
63. Central caliper bridge coupling portion
64. Elongated element caliper inner side
65. Disc-outlet-side coupling arm
66. Disc-inlet-side pocket wall
67. Disc-outlet-side pocket wall
68. Pocket radially inner wall
X-X. Axial direction
R-R. Radial direction
T-T. Tangential direction
RE. Radially outer edge
RI. Radially inner edge
L-L. Longitudinal development axis of the spring body
M-M. Median axis of the brake pad
F1. Tangential component of the disc inlet side biasing action
F2. Radial component of the disc inlet side biasing action
F3. Tangential component of the disc outlet side biasing action
F4. Radial component of the disc outlet side biasing action
F5. Disc-inlet-side biasing action
F6. Disc-outlet-side biasing action

The invention claimed is:

1. A pad and spring assembly for a disc brake, comprising:
a disc and a brake caliper having a caliper body adapted to straddle the disc, said disc brake defining an axial direction either parallel to or coinciding with the rotation axis of the disc, a radial direction orthogonal to the axial direction, and a tangential or circumferential direction, orthogonal to both the axial direction and the radial direction; and wherein a radially inner sense, or radially inner direction, directed in the radial direction towards the rotation axis of the disc, and an opposite radially outer sense, or outer radial direction are defined;
said pad and spring assembly comprising at least one brake pad and at least one spring device;
wherein said spring device comprising a spring body having prevalently longitudinal development, comprising:
at least one coupling portion to connect said spring device to a portion of an associable brake caliper in removable manner;
at least one first thrust portion, or disc-inlet-side thrust portion,
at least one second thrust portion, or disc-outlet-side thrust portion, longitudinally opposite to said disc-inlet-side thrust portion with respect to said coupling portion of the thrust body;
said at least one first thrust portion and said at least one second thrust portion being adapted to bias at least one brake pad in the axial direction away from the disc, in the inner radial direction, and in the tangential direction in opposition to the rotation direction of the disc;
wherein each of said at least one first thrust portion and said at least one second thrust portion comprises at least one cradle comprising a convex surface, which in working position substantially faces the inner radial direction and is adapted to face the at least one brake pad; and
wherein said convex surface of the at least one cradle comprises a thrust surface, adapted to form an axial, tangential and radial abutment reference for at least one portion of a support plate of the at least one brake pad, so that said at least one pad, by pressing against said convex surface of the cradle of said at least one first thrust portion and of said at least one second thrust portion, puts in traction the spring body of said spring device between said disc-inlet-side thrust portion and said disc-outlet-side thrust portion, providing an assembly preload to the spring device;
wherein said at least one brake pad comprises at least one friction material and at least one support plate, said at least one support plate comprising a friction surface with which said friction material is associated, an opposite plate back, adapted to form an abutment reference of a brake caliper which can be associated with the brake pad, and a plate edge which delimits said friction surface and said opposite plate back;
said plate edge comprising a radially inner edge, facing the radially inner direction, and a radially outer edge, facing in the radially outer direction, wherein said radially outer edge comprises at least one protrusion edge which delimits at least one protrusion of the support plate, and wherein said at least one protrusion edge comprises at least one ramp surface, inclined with respect to the radial direction and to the tangential direction;
said at least one ramp surface forms an abutment reference for said at least one thrust surface of either said at least one disc-inlet-side thrust portion or said at least one disc-outlet-side thrust portion of the spring device which biases said at least one brake pad in the axial, tangential and the inner radial directions, so that, by pressing said at least one brake pad in the outer radial direction against the convex surface of the cradle of said at least one disc inlet thrust portion and of said at least one disc-outlet-side thrust portion of the spring device, said at least one ramp surface of the support plate puts in traction the spring body between said disc-inlet-side thrust portion and said disc-outlet-side thrust portion, to also provide the assembly preload to the spring device.

2. The pad and spring assembly according to claim 1, wherein said ramp surface comprises an axially inner arris which delimits said ramp surface and said friction surface of the protrusion; and wherein said axially inner arris of the ramp surface comprises a contact portion between the brake pad and the thrust surface of the spring device; and/or wherein an axially inner arris of the ramp surface is substantially rectilinear and inclined with respect to the tangential direction and to the radial direction; and wherein said at least one ramp surface is inclined so that an extension thereof encounters a definable median axis of the brake pad, said median axis being parallel to the radial direction, in a portion radially outside said radially outer portion of the support plate; and/or wherein said at least one first thrust portion of at least either said first thrust portion or said at least one second thrust portion of the spring device elastically biases said at least one brake pad.

3. The pad and spring assembly according to claim 1, wherein said radially outer edge of the support plate comprises two separate protrusions, tangentially opposite with respect to said median axis, wherein each of said two separate protrusions comprises a ramp surface, so that said radially outer edge of the support plate comprises two opposite ramp surfaces; and/or wherein said two opposite ramp surfaces comprise a first ramp surface, or disc-inlet-side ramp surface, and a second opposite ramp surface, or disc-outlet-side ramp surface; and wherein said disc-inlet-side ramp surface forms an abutment reference for said at least one thrust surface of the disc-inlet-side thrust portion of the spring device and said disc-outlet-side ramp surface forms an abutment reference for said at least one thrust surface of the disc-outlet-side thrust portion of the spring device; and/or wherein the extensions of said two opposite side ramps converge in a portion radially outside the outer radially edge of the support plate; and/or wherein said radially outer edge of the support plate comprises a radially outer edge central portion and opposite radially outer edge side portions, tangentially by the side of said radially outer edge central portion, wherein at least one of said radially outer edge side portions comprises said ramp surface; and/or wherein said radially outer edge central portions is free from appendixes or protrusions; and/or wherein said pad and spring assembly comprises two opposite brake pads and a spring device comprising four cradles at the tangential and axial ends of the spring body, each cradle comprising said at least one thrust surface, so as to influence simultaneously said two opposite brake pads both in the axial direction away from the disc, and in the inner radial direction, and in the tangential direction to contrast the tangential acceleration of the brake pad during the braking action.

4. A brake caliper for a disc brake, said disc brake defining an axial direction either parallel to or coinciding with the rotation axis of brake disc, a radial direction orthogonal to the axial direction, and a tangential or circumferential direction, orthogonal both to the axial direction and to the radial direction; and wherein a radially inner sense, or radially inner direction, directed in radial direction towards the rotation axis of the disc, and an opposite radially outer sense, or outer radial direction are defined;

said brake caliper comprises a caliper body, adapted to be arranged straddling the disc and at least one pad and spring assembly, according to claim 1, wherein said caliper body comprises:

two opposite elongated elements each of which is adapted to face a braking surface of the disc either directly or indirectly via said at least one brake pad, at least one caliper bridge which connects said two elongated elements to each other;

and wherein said spring device is coupled by snapping its coupling portion to the caliper bridge and biases at least one brake pad in the axial direction away from the disc, in an inner radial direction, and in the tangential direction opposite to the rotation sense of the disc to contrast the tangential acceleration of the brake pad during the braking action;

and wherein during the braking action, said at least one brake pad subjects to a traction reaction the spring body of said spring device between said coupling portion and at least either said disc-inlet-side thrust portion or said disc-outlet-side thrust portion.

5. The brake caliper according to claim 4, wherein said caliper bridge is a central caliper bridge, so that said spring device couples by snapping its coupling portion to the central caliper bridge; and wherein said central caliper bridge comprises a radially inner bridge side, adapted to face the disc of the brake disc, and said coupling portion of the spring device embraces at least one bridge inner radial side portion of the caliper central bridge; and wherein said coupling portion of the spring device comprises a disc-inlet-side coupling arm and an opposite disc outlet coupling arm, so that during the braking action, said at least one brake pad puts in traction the spring body of said spring device between said disc inlet thrust portion and said disc-outlet-side coupling arm and between said disc-outlet-side thrust portion and said disc-inlet-side coupling arm.

6. The brake caliper according to claim 4, wherein each of said at least two opposite elongated elements comprises an inner caliper side elongated element, adapted to face a braking surface of the disc either directly or indirectly via said at least one brake pad; said inner caliper side elongated element of the caliper body comprising pocket walls which at least partially delimit a pad housing pocket, said pocket walls forming tangential abutment reference for the disc-inlet-side flank and the disc-outlet-side flank of the support plate of the at least one brake pad to transmit the braking action of the at least one brake pad to the caliper body of the brake caliper; and wherein said caliper body is of the monoblock type; or wherein said caliper body comprises two caliper half-bodies.

7. The disc brake comprising at least one brake caliper, according to claim 4, and at least one disc comprising opposite braking surface.

8. The pad and spring assembly according to claim 1, wherein said convex surface of said cradle of said at least one first thrust portion and of said at least one second thrust portion comprises at least one first cylindrical surface portion, having axis inclined with respect to the axial direction; and/or wherein said convex surface of the cradle is sloping towards the longitudinal development axis of the spring body; and/or wherein said coupling portion comprises at least one coupling clip which protrudes projecting from said spring body; and wherein when in a working position, said at least one coupling clip extends in outer radial direction from said spring body; and wherein said coupling portion comprises at least two opposite arms which protrude substantially projecting from said spring body, so to extend non-parallel to the longitudinal development axis of the spring body; and/or wherein said at least one first thrust portion and said at least one second thrust portion elastically bias said at least one brake pad.

9. The pad and spring assembly according to claim 1, wherein said spring device is made in one single piece; and/or wherein said spring device is made in a leaf spring; and/or wherein said spring device is made by shearing and folding a single metal sheet.

10. The pad and spring assembly according to claim 1, wherein said at least one ramp surface is inclined so that an extension thereof encounters a definable median axis of the brake pad, said median axis being parallel to the radial direction, in a portion radially outside said radially outer edge of the support plate.

11. The pad and spring assembly according to claim 1, wherein said at least one ramp surface is inclined so that the spring biases said support plate at least in the radial inner direction, and in the tangential direction towards a definable median axis of the brake pad, said median axis being parallel to the radial direction.

12. The pad and spring assembly according to claim 1, wherein said spring device has a planar body portion bounded by a radially extending disc-outlet-side coupling arm and a radially extending disc-inlet-side coupling arm, wherein two elastic arms each define a spring window between them between each of the disc-inlet-side coupling arm and the disc-outlet-side coupling arm and respective fork portions of said at least one first thrust portion and at least one second thrust portion, wherein each elastic arm extends in the radial direction for a first radial distance, and said fork portions extend in the radial direction a second radial distance, wherein said second radial distance is greater than the first radial distance.

* * * * *